US010694476B2

United States Patent
Van Bussel et al.

(10) Patent No.: US 10,694,476 B2
(45) Date of Patent: Jun. 23, 2020

(54) METHOD FOR ENABLING LAWFUL INTERCEPTION IN A TELECOMMUNICATIONS NETWORK, USER EQUIPMENT FOR ENABLING LAWFUL INTERCEPTION IN A TELECOMMUNICATIONS NETWORK, BASE TRANSCEIVER STATION FOR ENABLING LAWFUL INTERCEPTION IN A TELECOMMUNICATIONS NETWORK, PROGRAM AND COMPUTER PROGRAM PRODUCT

(71) Applicant: DEUTSCHE TELEKOM AG, Bonn (DE)

(72) Inventors: Han Van Bussel, Utrecht (NL); Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 630 days.

(21) Appl. No.: 14/418,479

(22) PCT Filed: Aug. 1, 2013

(86) PCT No.: PCT/EP2013/066222
§ 371 (c)(1),
(2) Date: Jan. 30, 2015

(87) PCT Pub. No.: WO2014/020125
PCT Pub. Date: Feb. 6, 2014

(65) Prior Publication Data
US 2015/0304970 A1    Oct. 22, 2015

(30) Foreign Application Priority Data
Aug. 2, 2012 (EP) .................................. 12005625

(51) Int. Cl.
*H04B 7/00* (2006.01)
*H04W 52/38* (2009.01)
(Continued)

(52) U.S. Cl.
CPC ......... *H04W 52/383* (2013.01); *H04L 63/306* (2013.01); *H04W 12/02* (2013.01);
(Continued)

(58) Field of Classification Search
CPC ......... H04L 29/06; H04L 63/306; H04L 9/08; H04L 63/062; H04L 63/20; H04L 63/205;
(Continued)

(56) References Cited

U.S. PATENT DOCUMENTS 5,913,161 A    6/1999  Ozulkulu et al.
2004/0203582 A1  10/2004  Dorenbosch et al.
(Continued)

FOREIGN PATENT DOCUMENTS

CN    102548014 A    7/2012
KR  1020090003946 A    1/2009
(Continued)

OTHER PUBLICATIONS

ETSI TS 133 107 V8.8.0 (Jul. 2009), Universal Mobile Telecommunications Systems (UMTS); LTE; 3G security; Lawful interception architecture and functions (3GPP TS 33.107 version 8.8.0 Release 8), Jul. 1, 2009, pp. 22-30, 61-78.

*Primary Examiner* — Xin Jia
(74) *Attorney, Agent, or Firm* — Leydig, Voit & Mayer, Ltd.

(57) ABSTRACT

A method for enabling lawful interception in a telecommunications network includes: receiving, by a base transceiver station, a request from the user equipment to conduct a device, to device communication; and sending, by the base transceiver station, a first message to the user equipment.
(Continued)

The first message comprises the indication of a permission to conduct a device to device communication by the user equipment. Either the first message or a second message sent from the base transceiver station to the user equipment comprises a transmission power information. The transmission power information indicates the value of the minimum, transmission power of the user equipment when conducting device to device communication. The transmission power of the user equipment is set high enough by the user equipment to allow reception of the device to device communication at the base transceiver station.

5 Claims, 2 Drawing Sheets

(51) Int. Cl.
*H04W 76/14* (2018.01)
*H04L 29/06* (2006.01)
*H04W 12/02* (2009.01)
*H04W 88/02* (2009.01)

(52) U.S. Cl.
CPC ......... *H04W 52/386* (2013.01); *H04W 76/14* (2018.02); *H04W 88/02* (2013.01)

(58) Field of Classification Search
CPC ... H04W 12/04; H04W 76/023; H04W 72/04; H04W 72/0446; H04W 72/1284; H04W 84/18; H04W 72/0406; H04W 72/082
USPC ................................................ 455/41.2, 522
See application file for complete search history.

(56) References Cited

U.S. PATENT DOCUMENTS

| 2013/0005377 A1* | 1/2013 | Wang ................ H04W 72/0406 455/509 |
| 2013/0010961 A1 | 1/2013 | Morimoto et al. |
| 2013/0290696 A1* | 10/2013 | Broustis .................... H04L 9/08 713/150 |
| 2013/0322345 A1* | 12/2013 | Vasudevan ............ H04W 72/04 370/329 |
| 2014/0128089 A1* | 5/2014 | Jang .................... H04W 72/082 455/452.2 |
| 2015/0094064 A1* | 4/2015 | Lei ...................... H04W 76/023 455/436 |

FOREIGN PATENT DOCUMENTS

| WO | WO 2008023781 A | 2/2008 |
| WO | WO 2008067849 A1 | 6/2008 |
| WO | WO 2013145990 A | 10/2013 |

* cited by examiner

METHOD FOR ENABLING LAWFUL INTERCEPTION IN A TELECOMMUNICATIONS NETWORK, USER EQUIPMENT FOR ENABLING LAWFUL INTERCEPTION IN A TELECOMMUNICATIONS NETWORK, BASE TRANSCEIVER STATION FOR ENABLING LAWFUL INTERCEPTION IN A TELECOMMUNICATIONS NETWORK, PROGRAM AND COMPUTER PROGRAM PRODUCT

CROSS-REFERENCE TO RELATED APPLICATIONS

This application is a U.S. National Phase application under 35 U.S.C. § 371 of International Application No. PCT/EP2013/066222, filed on Aug. 1, 2013, and claims benefit to European Patent Application No. EP 12005625.4, filed on Aug. 2, 2012. The International Application was published in English on Feb. 6, 2014 as WO 2014/020125 under PCT Article 21(2).

FIELD

The present invention relates to a method for enabling lawful interception in a telecommunications network, especially a public land mobile network.

The present invention further relates to a user equipment for enabling lawful interception in a telecommunications network, and to a base transceiver station for enabling lawful interception in a telecommunications network.

BACKGROUND

For any communication via public land mobile networks, operators have the legal obligation to provide means for lawful interception towards the national authorities. Normally, the network provides a special lawful interception interface which allows breaking out traffic towards and from terminal devices which are subject to lawful interception. The details of the lawful interception requirements, lawful interception architecture and lawful interception interfaces are defined by 3GPP in TS 33.106, TS 33.107 & TS 33.108. In 3GPP the interface is called "Handover interface for lawful interception". Depending on the service domain (Circuit Switched vs. packet switched), the interfaces for traffic being forwarded to the lawful interception interface originate in the MSC (Mobile Switching Center), e.g. for CS voice traffic, or in the GGSN (GPRS (Global Packet Radio System) Gateway Support Node), e.g. for packet data services.

SUMMARY

In an embodiment, the invention provides a method for enabling lawful interception in a telecommunications network. The telecommunications network comprising a core network and an access network. A user equipment, camping on the telecommunications network, is enabled for device to device communication. The access network of the telecommunications network comprises a base transceiver station. The user equipment is connected to the base transceiver station and the base transceiver station is enabled for allowing the user equipment to conduct device to device communication. A minimum transmission power level corresponds to the smallest transmission power the user equipment uses when transmitting a radio signal. The user equipment is subjected to a lawful interception observation. The method includes: receiving, by the base transceiver station, a request from the user equipment to conduct a device to device communication; and sending, by the base transceiver station, a first message to the user equipment. The first message comprises the indication of a permission to conduct a device to device communication by the user equipment. Either the first message or a second message sent from the base transceiver station to the user equipment comprises a transmission power information. The transmission power information indicates the value of the minimum transmission power of the user equipment when conducting device to device communication. The transmission power of the user equipment is set high enough by the user equipment to allow reception of the device to device communication at the base transceiver station.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

As device to device communications define new communication services directly between user equipments (or terminal devices) in the cellular network, new authentication and administration procedures are required. Besides an authentication towards the network, control means have to be provided which allow a particular user equipment (or terminal) to transmit in a broadcast like way allowing reception by a multitude of terminal devices in proximity range.

In contrast to conventional communication in a cellular network, the realization of device to device communication means that situations can occur where neither the radio access network, nor the core network are part of the device to device user data communication path.

This is a challenge for fulfilling the requirements for lawful interception, as current methods require the telecommunications network, especially the access network of the telecommunications network, to be at least principally able to access the user data communication path in order to be able to duplicate the traffic towards the lawful interception entity. In the framework of device to device communication, such an access of the user data communication path is not provided for in case that a device to device communication link is established, especially a direct mode device to device communication.

In an embodiment, the invention provides a technically simple, effective and especially cost effective solution for enabling lawful interception in a telecommunications network, especially a public land mobile network, where the telecommunications network provides (or provides at least partly, e.g. within a part of the access network of the telecommunications network) device to device communication services and wherein user equipments that are camping on the telecommunications network and that are requesting and using such device to device communications services are behaving such that lawful interception can be realized as commonly known with cellular radio communication networks such as public land mobile networks.

In an embodiment, the invention provides a method for enabling lawful interception in a telecommunications network, the telecommunications network comprising a core network and an access network, wherein a user equipment, camping on the telecommunications network, is enabled for device to device communication, wherein the access network of the telecommunications network comprises a base transceiver station, wherein the user equipment is connected to the base transceiver station and the base transceiver station is enabled for allowing the user equipment to conduct device to device communication, wherein a minimum transmission power level corresponds to the smallest transmission power the user equipment uses when transmitting a radio signal, wherein in case that the user equipment is subjected to a lawful interception observation, and the user equipment is sending a request, to the base transceiver station, to conduct a device to device communication, a first message is sent from the base transceiver station to the user equipment, wherein the first message comprises the indication of a permission to conduct a device to device communication by the user equipment, wherein either the first message or a second message sent from the base transceiver station to the user equipment furthermore comprises a transmission power information, wherein the transmission power information indicates the value of the minimum transmission power of the user equipment when conducting device to device communication.

In an alternative embodiment, the invention provides a method for enabling lawful interception in a telecommunications network, the telecommunications network comprising a core network and an access network, wherein a user equipment, camping on the telecommunications network, is enabled for device to device communication, wherein the access network of the telecommunications network comprises a base transceiver station, wherein the user equipment is connected to the base transceiver station and the base transceiver station is enabled for allowing the user equipment to conduct device to device communication, wherein a minimum transmission power level corresponds to the smallest transmission power the user equipment uses when transmitting a radio signal, wherein in case that the user equipment is subjected to a lawful interception observation, and the user equipment is sending a request, to the base transceiver station, to conduct a device to device communication, a first message is sent from the base transceiver station to the user equipment, wherein the first message comprises the indication of a permission to conduct a device to device communication by the user equipment, wherein either the first message or a second message sent from the base transceiver station to the user equipment furthermore comprises a transmission power information, wherein the transmission power information indicates the value of the minimum transmission power of the user equipment, when conducting device to device communication, such that the transmission power of the user equipment is set high enough by the user equipment to allow reception of the device to device communication at the base transceiver station.

It is thereby advantageously possible according to the present invention that data traffic—which is exchanged between user equipments that are enabled for device to device communication—is captured for lawful interception purposes, especially such data traffic that is transmitted directly between two user equipments (or terminals) that are enabled for device to device communication (or directly between more than two, e.g. three, four or even more user equipments (or terminals) that are enabled for device to device communication purposes), such data traffic being transmitted on the direct path (between the user equipments) either in a broadcast like way, or in a dedicated communication (direct mode) between the two device to device enabled user equipments (or the multitude of device to device enabled user equipments/terminal devices.

According to the present invention, it is advantageously possible that lawful interception is possible even for situations where two or more user equipments communicate directly with each other according to device to device communication procedures. It has to be assured that the user traffic data transmitted to or from a user equipment that has to be monitored according to a lawful interception observation is accessible to the access network of the telecommunications network, i.e. at least a base transceiver station. According to the present invention, an increased transmission power level is imposed to such a user equipment subjected to a lawful interception monitoring as well as to such user equipments that are communicating with the user equipment to be monitored, especially in a direct mode device to device communication situation.

The increased transmission power level to be used by the user equipment subjected to a lawful interception observation is defined by setting a minimum transmission power level corresponding to the smallest transmission power that the user equipment uses when transmitting radio signals.

Typically, device to device communication cannot be initiated by a user equipment camping on a telecommunications network, especially a cellular public land mobile network, without the user equipment receiving a message comprising the consent of a component of the telecommunications network, especially a component of the access network, typically a base transceiver station, that the device to device communication is granted for that specific user equipment. This means that prior to initiating the device to device communication, the user equipment receives a message (hereinafter also called "first message") having at least the content (perhaps inter alia) to grant the possibility to conduct a device to device communication.

Either in this first message received from the base transceiver station or in another message (hereinafter also called "second message") received from the base transceiver station, the minimum transmission power level is communicated to the user equipment. This is done by means of the transmission of transmission power information, wherein the transmission power information indicates the value of the minimum transmission power of the user equipment when conducting device to device communication.

According to the present invention, the minimum transmission power level should be chosen such that a reliable reception, by the respective base transceiver station, of the radio signals transmitted by the user equipment subjected to a lawful interception observation is possible when conducting a device to device communication. The minimum transmission power level can, e.g., be indicated by means of the transmission power information in the form of coded information, e.g. a binary value using three bits for 8 different minimum transmission power levels, or using four bits for 16 different minimum transmission power levels or the like.

According to a preferred embodiment of the present invention, the request to conduct a device to device communication is a request to send a proximity transmission or a request to establish a direct mode transmission.

Thereby, it is advantageously possible to use the minimum transmission power level in different device to device communication situations.

According to a further preferred embodiment of the present invention, a further user equipment is camping on the telecommunications network, the further user equipment being enabled for device to device communication, wherein the further user equipment is connected to the base transceiver station and the base transceiver station is enabled for allowing the further user equipment to conduct device to device communication, wherein in case that the further user equipment is sending a further request, to the base transceiver station, to conduct a direct mode device to device communication with the user equipment while the user equipment being subjected to a lawful interception observation, a further first message is sent from the base transceiver station to the further user equipment, wherein the further first message comprises the indication of a permission to conduct a device to device communication, by the further user equipment, with the user equipment, wherein either the further first message or
a further second message sent from the base transceiver station to the further user equipment
comprises a further transmission power information, wherein the further transmission power information indicates of the minimum transmission power of the further user equipment when the conducting the direct mode device to device communication with the user equipment.

Thereby, it is advantageously possible to intercept the entire device to device communication of a user equipment that is subjected to a lawful interception observation, also such parts of the device to device communication that the user equipment has with another user equipment that is not subjected to a lawful interception observation.

Furthermore, the present invention relates to a user equipment for enabling lawful interception in a telecommunications network, the telecommunications network comprising a core network and an access network, wherein the user equipment, camping on the telecommunications network, is enabled for device to device communication, wherein the user equipment is connected to a base transceiver station of the access network of the telecommunications network, wherein the base transceiver station is enabled for allowing the user equipment to conduct device to device communication, wherein the user equipment is configured such that in case that the user equipment is subjected to a lawful interception observation, and the user equipment is sending a request, to the base transceiver station, to conduct a device to device communication, a first message is received by the user equipment from the base transceiver station, wherein the first message comprises the indication of a permission to conduct a device to device communication by the user equipment, wherein the user equipment is configured such that a minimum transmission power level corresponds to the smallest transmission power the user equipment uses when transmitting a radio signal, and the minimum transmission power is used by the user equipment when conducting device to device communication, wherein the minimum transmission power is indicated by a transmission power information received by the user equipment either by the first message
or by a second message sent from the base transceiver station to the user equipment.

Alternatively, the present invention relates furthermore also to a user equipment for enabling lawful interception in a telecommunications network, the telecommunications network comprising a core network and an access network, wherein the user equipment, camping on the telecommunications network, is enabled for device to device communication, wherein the user equipment is connected to a base transceiver station of the access network of the telecommunications network, wherein the base transceiver station is enabled for allowing the user equipment to conduct device to device communication, wherein the user equipment is configured such that in case that the user equipment is subjected to a lawful interception observation, and the user equipment is sending a request, to the base transceiver station, to conduct a device to device communication, a first message is received by the user equipment from the base transceiver station, wherein the first message comprises the indication of a permission to conduct a device to device communication by the user equipment, wherein the user equipment is configured such that a minimum transmission power level corresponds to the smallest transmission power the user equipment uses when transmitting a radio signal, and the minimum transmission power is used by the user equipment when conducting device to device communication, wherein the minimum transmission power is indicated by a transmission power information received by the user equipment
either by the first message
or by a second message sent from the base transceiver station to the user equipment, and
such that the transmission power of the user equipment is set high enough by the user equipment to allow reception of the device to device communication at the base transceiver station.

Thereby, it is advantageously possible that the user equipment, being subjected to a lawful interception observation, is able to conduct device to device communication and the data traffic can nevertheless be intercepted.

It is furthermore preferred according to the present invention—also with respect to the user equipment—that the request to conduct a device to device communication is a request to send a proximity transmission or a request to establish a direct mode transmission.

Additionally, the present invention relates to a base transceiver station for enabling lawful interception in a telecommunications network, the telecommunications network comprising a core network and an access network, wherein a user equipment, camping on the telecommunications network, is enabled for device to device communication, wherein the user equipment is connected to the base transceiver station of the access network of the telecommunications network, wherein the base transceiver station is enabled for allowing the user equipment to conduct device to device communication, wherein a minimum transmission power level corresponds to the smallest transmission power the user equipment uses when transmitting a radio signal, wherein the base transceiver station is configured such that in case that the user equipment is subjected to a lawful interception observation, and the base transceiver station is receiving a request, by the user equipment, to conduct a device to device communication, a first message is sent by the base transceiver station to the user equipment, wherein the first message comprises the indication of a permission to conduct a device to device communication by the user equipment, wherein the base transceiver station is configured such that either the first message or a second message sent from the base transceiver station to the user equipment furthermore comprises a transmission power information, wherein the transmission power information indicates the minimum transmission power of the user equipment when conducting device to device communication.

Alternatively, the present invention relates additionally also to a base transceiver station for enabling lawful interception in a telecommunications network, the telecommunications network comprising a core network and an access network, wherein a user equipment, camping on the telecommunications network, is enabled for device to device communication, wherein the user equipment is connected to the base transceiver station of the access network of the telecommunications network, wherein the base transceiver station is enabled for allowing the user equipment to conduct device to device communication, wherein a minimum transmission power level corresponds to the smallest transmission power the user equipment uses when transmitting a radio signal, wherein the base transceiver station is configured such that in case that the user equipment is subjected to a lawful interception observation, and the base transceiver station is receiving a request, by the user equipment, to conduct a device to device communication, a first message is sent by the base transceiver station to the user equipment, wherein the first message comprises the indication of a permission to conduct a device to device communication by the user equipment, wherein the base transceiver station is configured such that either the first message or a second message sent from the base transceiver station to the user equipment furthermore comprises a transmission power information, wherein the transmission power information indicates the minimum transmission power of the user equipment when conducting device to device communication such that the transmission power of the user equipment is set high enough by the user equipment to allow reception of the device to device communication at the base transceiver station.

The base transceiver station advantageously provides the possibility that a user equipment, being subjected to a lawful interception observation, can use device to device communication services and communication traffic can nevertheless be intercepted.

Additionally, the present invention relates to a program comprising a computer readable program code which, when executed on a computer or on a user equipment or on a base transceiver station, causes the computer or the user equipment or the base transceiver station to perform the inventive method.

Still additionally, the present invention relates to computer program product for using a user equipment with a base transceiver station, the computer program product comprising a computer program stored on a storage medium, the computer program comprising program code which, when executed on a computer or on the user equipment or on the base transceiver station, causes the computer or the user equipment or the base transceiver station to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
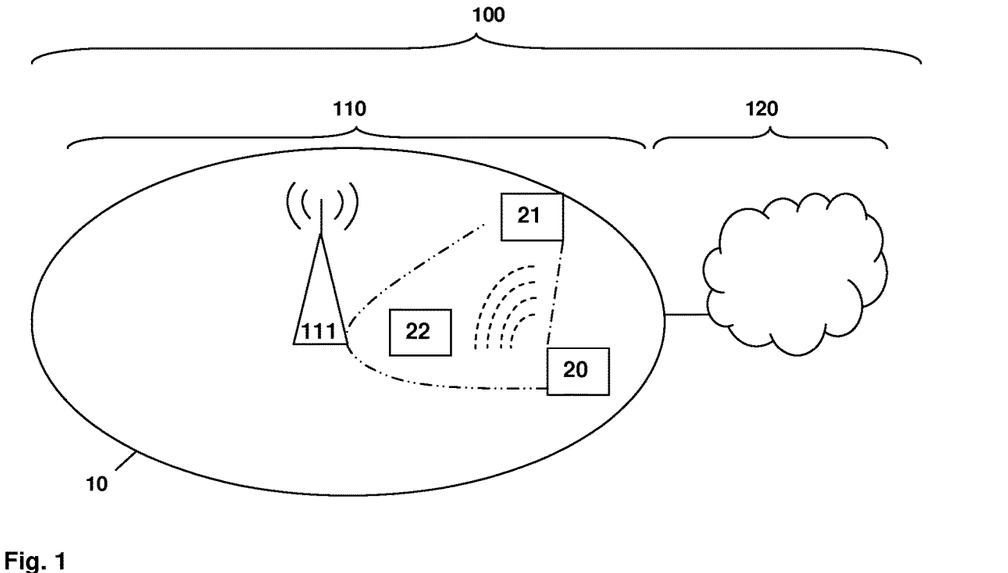
FIG. 1 schematically illustrates a telecommunications network that is enabled for allowing user equipments, camping on the telecommunications network, especially a public land mobile network, the possibility to conduct device to device communication.

In FIG. 1, a telecommunications network 100, especially a public land mobile network 100, is schematically shown, the telecommunications network 100 comprising an access network 110 and a core network 120. The telecommunications network 100 is preferably a cellular telecommunications network comprising typically a plurality of network cells, one of which is represented in FIG. 1 by means of a drawnthrough line and reference sign 10. In the telecommunications network 100, typically a plurality of user equipments 20, 21, 22 are camping on the telecommunications network 100 within the network cell 10, i.e. the user equipments 20, 21, 22 are connected or are camping on a base transceiver station 111 serving the cell 10. The base transceiver station 111 is typically a base station, e.g. a NodeB or an eNodeB base transceiver station.

The telecommunications network 100 allows at least in parts of the telecommunications network 100 that user equipments 20, 21, 22 use device to device communication services. Especially, the base transceiver station 111 is enabled for allowing the user equipments 20, 21, 22 to conduct device to device communication services. The user equipments 20, 21, 22 are also enabled for device to device communication.

The core network 120 is only schematically shown by means of a cloud representation. The public land mobile network 100 (especially the core network 120) comprises typically various network elements such as an MSC (Mobile Switching Center), a SGSN (Serving GPRS Support Node), a MME (Mobility Management Entity), preferably a plurality of network element thereof. These network elements are hierarchically higher network elements than the base transceiver station 111.

In FIGS. 2 to 5, communication diagrams between the base transceiver station 111 and user equipments 20 and 21 according to the present invention are schematically shown.

According to the present invention, the user equipment designated by reference sign 20 is a user equipment that is subjected to a lawful interception observation and is also called a first user equipment 20. Furthermore according to the present invention, the user equipment designated by reference sign 21 is a so-called further user equipment (also called second user equipment 21) that is not subjected to a lawful interception observation but is communicating with the user equipment 20 (or first user equipment 20).

The premise is that the user equipment 20 and the further user equipment 21 are camping on the radio cell 10 served by the base transceiver station 111. The base transceiver station 111 is a controlling base station of any cellular radio technology. The purpose of the base transceiver station 111 (or base station) (and optionally the connected network elements of the core network 120) is to authenticate the user equipments 20, 21, 22 (or the corresponding subscriber) of the service or services using device to device communication and grant a data transmission for this device or these devices (i.e. user equipment or user equipments). The base transceiver station 111 furthermore controls the channel allocation (i.e. which radio resources shall be used by the user equipment or user equipments 20, 21, 22 for the device to device communication, especially for the related user data transmission; in this respect, the radio technology, frequency, time slot, transmission code, etc. are defined and allocated by the base transceiver station 111). Furthermore, the base transceiver station 111 informs the user equipment 20 or the plurality of user equipments 20, 21, 22 about transmission parameters to be used, such as, e.g., scrambling codes, modulation and coding schemes, possibly a radio identifier and transmission parameters like data rate, maximum allowed transmission power, etc. During the normal operation of the device to device communication, the controlling base transceiver station 111 might grant an access authentication attempt of a device to device user equipment 20, 21, 22 and in turn assigns parameters required to define the transmission resource. These parameters may be (partly) predefined, or valid for multiple transmissions.

Typically, device to device communication can occur in different communication contexts or according to different communication situations, which need to be distinguished for the grant of a device to device communication transmission:

The first is referred here as "device to device proximity transmission", i.e. a transmission, by the user (first) equipment 20, of data in a proximity range (around the (first) user equipment 20) that allows reception of such data by a single or a multitude of device to device enabled user equipments 21, 22 in the vicinity of the transmitting device to device enabled device (i.e. in the vicinity of the (first) user equipment 20).

Furthermore, a direct user data transmission—also called device to device direct mode transmission—between device to device enabled terminals (or user equipments) might be granted by the base transceiver station 111 (i.e. the controlling telecommunications network) where user data exchange is conducted directly between the user equipments 20, 21, 22 concerned, e.g. between the (first) user equipment 20 and the (second) further user equipment 21, i.e. not involving the base transceiver station 111 (except for the exchange of control or signalization information needed to be exchanged with the base transceiver station 111).

Additionally, the classical transmission between two mobile terminals (or user equipments) via the base transceiver station 111 and optionally also via the core network 120 might occur, which is referred to by the expression of "device to device default data path transmission" in the context of the present invention. This "default data path transmission" can be optimised to exclude the core network 120 in the data path and is thus called "locally routed data path".

The present invention is, however, focused on the handling—especially with respect to lawful interception purposes—of the two other device to device communication modes, i.e. device to device proximity transmission and device to device direct mode transmission.

Figure 2:
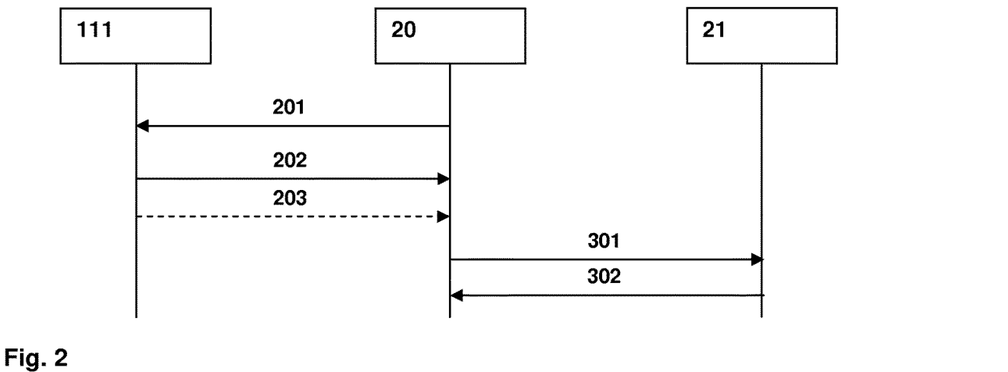
FIGS. 2 to 5 schematically illustrate communication diagrams between a base transceiver station and user equipments according to the present invention.
Figure 3:
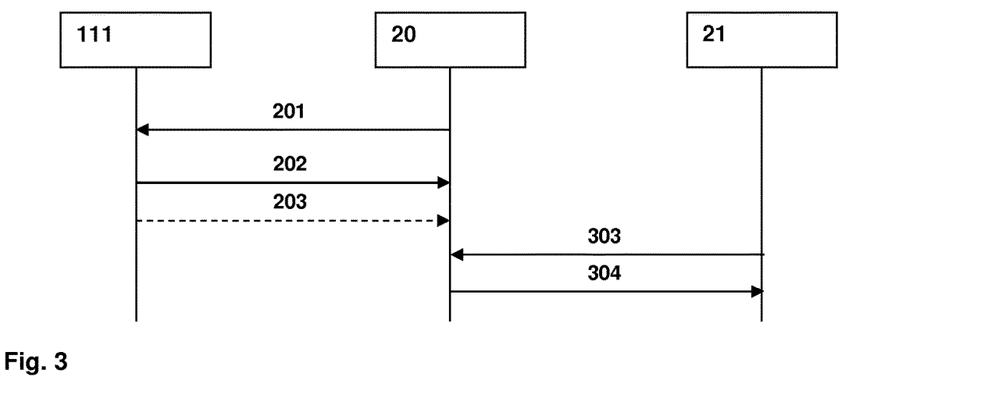

In FIGS. 2 and 3, device to device communication occurs between the user equipment 20 and the further user equipment 21 (or between the first user equipment 20 and the second user equipment 21) using the device to device proximity transmission. In the situation illustrated in FIG. 2, a device to device proximity transmission 301 is initiated by the user equipment 20 (or first user equipment 20). This device to device proximity transmission 301 of the user equipment 20 is answered by the further user equipment 21 (or second user equipment 21) by means of a proximity transmission answer 302 to the proximity transmission 301. In the situation illustrated in FIG. 3, a further device to device proximity transmission 303 is initiated by the further user equipment 21 (or second user equipment 21). This further device to device proximity transmission 303 of the further user equipment 21 is answered by the user equipment 20 (or first user equipment 20) by means of a further proximity transmission answer 304 to the further proximity transmission 303.

In both cases illustrated in FIGS. 2 and 3, in a preliminary step—i.e. prior to the transmission of the device to device proximity transmissions 301, 303 and the respective proximity transmission answers 302, 304—of the communication of the (first) user equipment 20 and the further (or second) user equipment 21 with the base transceiver station 111, the user equipment 20 sends a request 201 to the base transceiver station 111 requesting to be allowed to use device to device services, and the base transceiver station 111 sends a first message 202 granting access to device to device communication services to the (first) user equipment 20. Either in the first message 202 or in an additional second message 203, the base transceiver station 111 furthermore indicates a minimum transmission power to be used for the device to device communication services, i.e. for the device to device proximity transmission 301 (in the communication situation of FIG. 2) and for the device to device proximity transmission answer 304 (in the communication situation of FIG. 3).

Figure 4:
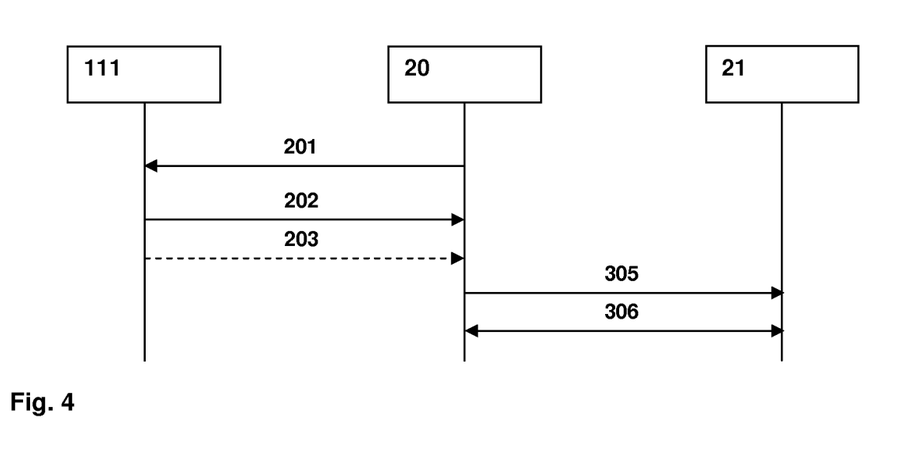
Figure 5:
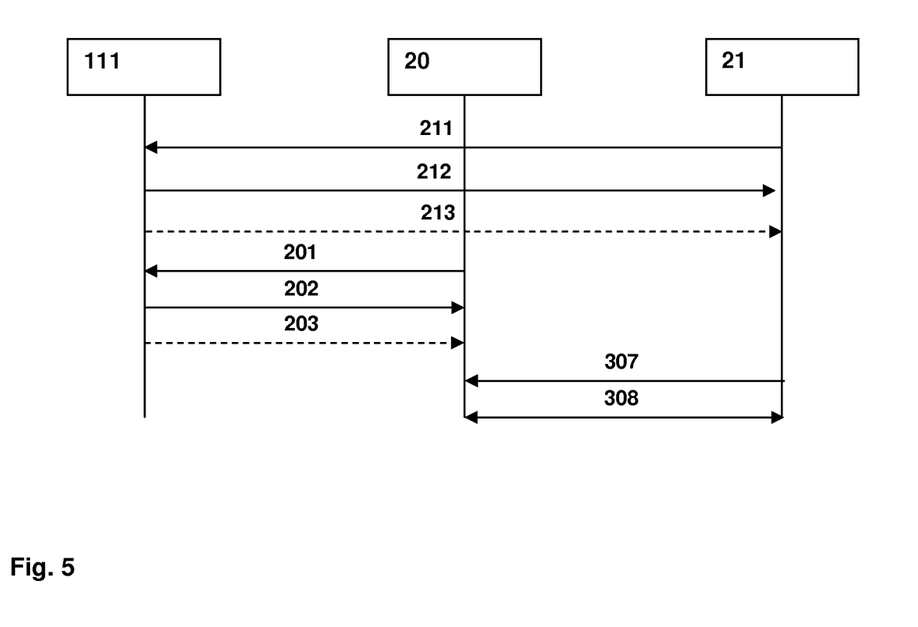

In FIGS. 4 and 5, device to device communication occurs between the user equipment 20 and the further user equipment 21 (or between the first user equipment 20 and the second user equipment 21) using the device to device direct mode transmission. In the situation illustrated in FIG. 4, a device to device direct mode transmission 305 towards the further (or second) user equipment 21 is initiated by the user equipment 20 (or first user equipment 20). This request by the user equipment 20 is answered by the further user equipment 21 (or second user equipment 21) and a device to device direct mode transmission 306 initiated. In the situation illustrated in FIG. 5, a device to device direct mode transmission 307 towards the (first) user equipment 20 is initiated by the further user equipment 21 (or second user equipment 21). This request by the further user equipment 21 (or second user equipment 21) is answered by the user equipment 20 (or first user equipment 20) and a device to device direct mode transmission 308 initiated.

In both cases illustrated in FIGS. 4 and 5, in a preliminary step—i.e. prior to the transmission of the requests to establish a device to device direct mode transmissions to the respective other user equipment—of the communication of the (first) user equipment 20 and the further (or second) user equipment 21 with the base transceiver station 111, the user equipment initiating the device to device direct mode transmission (i.e. the first user equipment 20 for the case illustrated in FIG. 4, and the second user equipment 21 for the case illustrated in FIG. 5) sends a request to the base transceiver station 111 requesting to be allowed to use device to device services, and to set up a direct mode transmission to the other user equipment. This request corresponds, for the case illustrated in FIG. 4, to the request 201 of the (first) user equipment 20 towards the base transceiver station 111 indicating that a direct mode device to device transmission towards the further (or second) user equipment 21 is requested; for the case illustrated in FIG. 5, this request corresponds, to a request 211 of the further (or second) user equipment 21 towards the base transceiver station 111 indicating that a direct mode device to device transmission towards the (first) user equipment 20 is requested. In the situation of FIG. 4, the base transceiver station 111 sends the first message 202 granting access to device to device communication services to the (first) user equipment 20. Either in the first message 202 or in the additional second message 203, the base transceiver station 111 furthermore indicates a minimum transmission power to be used for the device to device communication services, i.e. for the device to device direct mode transmission 305. In the situation of FIG. 5, the base transceiver station 111 sends a further first message 212 granting access to device to device communication services to the further (or second) user equipment 21. Either in the further first message 212 or in an additional second message 213, the base transceiver station 111 furthermore indicates a minimum transmission power to be used for the device to device communication services, i.e. for the device to device direct mode transmission 307.

In a typical device to device communication situation, i.e. without lawful interception observation, the controlling base station would control the transmission power of the respective user equipments within the radio cell or in proximity of each other in a way that a number of device to device communication enabled devices in the proximity range of the transmitting device to device enabled user equipment are able to receive the broadcast transmission of that user equipment. This is mainly in order to ensure that a transmission can be received within a defined range of the transmitting device to device user equipment, and limit interference problems with respect to other transmissions that could occur in case that the transmission power used by the device to device enabled user equipment is exceedingly high. Such a control of the transmission power of the respective user equipments within the radio cell or in proximity of each other can, e.g., either be performed by means of setting, imposed by the base transceiver station, one defined transmission power level or value (for all such device to device communication enabled devices) or a plurality of defined transmission power levels or values, each for one of the respective device to device communication enabled user equipments, or be performed such that one defined transmission power range (i.e. between a lower transmission power level and a higher transmission power level) is set (e.g. for all such device to device communication enabled devices) or a plurality of defined transmission power ranges, each for one of the respective device to device communication enabled user equipments are set by the base transceiver station and the actual transmission power level to be used is defined by the respective user equipment or user equipments, such that device to device communication enabled devices in the proximity range of the transmitting device to device enabled user equipment are able to receive the broadcast transmission of that user equipment.

However, in case that a device to device data transmission (either the device to device proximity transmission (or proximity message) or the device to device direct mode transmission) are to be initiated by a user equipment subject to lawful interception requirements, it needs to be ensured that the content of the transmitted data can be received somewhere in the radio access network 110 of the telecommunications network 100 for further routing to the lawful interception interface of the telecommunications network 100. This can be assured, e.g., by imposing the minimum transmission power directly by the base transceiver station or by setting (or imposing), by the base transceiver station, the above mentioned defined transmission power range or the plurality of defined transmission power ranges such that the lower transmission power level corresponds to the minimum transmission power.

In case that a user equipment under lawful interception observation requests authentication for a device to device proximity transmission (i.e. in the situation illustrated in FIG. 2), the controlling network (i.e. the base transceiver station) configures the grant for the requested device to device proximity transmission in such a way that it is ensured that the base transceiver station 111 can also receive the proximity transmission 301. According to the present invention, this is done by setting the transmission power of the user equipment 20 to be used to a value high enough so that the base transceiver station 111 can also receive this proximity transmission. As the controlling base transceiver station 111 is in charge of controlling all the radio resource utilisation under its coverage area (e.g. the radio cell), it can also allocate dedicated transmission resources for the actual device to device direct mode (or direct path) transmission for the user equipment 20 under observation, thereby minimising interference problems.

In a further exemplary situation (illustrated in FIG. 3), the user equipment 20 being subject for lawful interception observation is not the user equipment 21 originating the device to device proximity transmission 303. The user equipment 20 subjected to lawful interception observation is just receiving the device to device proximity transmission 303 (from the further user equipment 21, i.e. the originator) and is joining the originator (further user equipment 21), e.g. for further device to device direct communication. In this case, the receiver of the device to device proximity transmission 303 (i.e. the first user equipment 20) sends a "joining request" message to the controlling base transceiver station 111 which in turn links this user to the originator (i.e. the second user equipment 21) of the device to device proximity transmission 303.

According to another situation illustrated in FIGS. 4 and 5, a device to device enabled user equipment requires the setup of a device to device direct mode transmission (or direct mode path) to another device to device enabled user equipment, the controlling base transceiver station 111 can either set the configuration of the transmission for both terminals in a way that the base transceiver station 111 can receive the transmissions of both of the terminals (e.g. by setting the transmission power of both user equipments 20, 21 to higher values as normally required for the direct data transmission between the user equipments 20, 21) or to set up the "default data path transmission" or the "locally routed data path" in order to ensure that the data traffic is exchanged via the base transceiver station 111 or even the core network 120 and classic lawful interception can be used.

The present invention also refers to the situation where a lawful interception of all terminals (or user equipments) in a given area (e.g. a radio cell 10 of the telecommunications network 100) is required, especially by intercepting device to device proximity transmissions and/or device to device direct mode transmissions. In this case the device to device proximity transmission of any terminal in the respective area (so without a selection of individual subscribers, based on, e.g., the IMSI (International Mobile Subscriber Identity)) is set to a transmission power which is high enough to allow reception of the device to device messages at the controlling base transceiver station. This can be useful for authorities in case of group gatherings of persons under special legal observation or an area requiring specific observation of device to device communication (e.g. prisons).

According to another preferred embodiment of the present invention, user equipments can be used for relaying purposes of data path data transmitted between device to device enabled user equipments using device to device communication. This means that in a situation such that a device to device proximity transmission or direct mode transmission of a user equipment subjected to lawful interception cannot be received at the base transceiver station 111 (even though the user equipment already applies its maximum transmission power which is possible)

but can be received at a third user equipment 22 and a radio transmission between the third user equipment 22 and the base transceiver station 111 is possible, then the third user equipment 22 can be used as a relay of this device to device transmission towards the base transceiver station 111.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enabling lawful interception in a telecommunications network, the telecommunications network comprising a core network and an access network, wherein a user equipment, camping on the telecommunications network, is configured for device to device communication, wherein the access network of the telecommunications network comprises a base transceiver station, wherein the user equipment is connected to the base transceiver station and the base transceiver station is configured for allowing the user equipment to conduct device to device communication, wherein the user equipment is subject to lawful interception, the method comprising:

receiving, by the base transceiver station, a request from the user equipment to conduct a direct or proximity device to device communication not routed through the base transceiver station; and sending, by the base transceiver station, a first message to the user equipment, wherein the first message comprises an indication of permission for the user equipment to conduct the direct or proximity device to device communication, wherein either the first message or a second message sent from the base transceiver station to the user equipment comprises transmission power information, wherein the transmission power information indicates a minimum transmission power of the user equipment for conducting the direct or proximity device to device communication, such that the direct or proximity device to device communication is subject to lawful interception based on the transmission power of the user equipment being set high enough by the user equipment to allow reception of the direct or proximity device to device communication at the base transceiver station;

wherein the base transceiver station allocates dedicated transmission resources for the user equipment to conduct the direct or proximity device to device communication subject to lawful interception, wherein allocating the dedicated resources includes specifying a radio technology, a frequency and a time slot for the user equipment to conduct the direct or proximity device to device communication subject to lawful interception.

2. The method according to claim 1, wherein a further user equipment is camping on the telecommunications network, the further user equipment being configured for device to device communication, wherein the further user equipment is connected to the base transceiver station and the base transceiver station is configured for allowing the further user equipment to conduct device to device communication, the method further comprising:

receiving, by the base transceiver station, a further request from the further user equipment to conduct a direct mode device to device communication with the user equipment while the user equipment is subject to lawful interception;

sending, by the base transceiver station, a further first message to the further user equipment, wherein the further first message comprises an indication of permission for the further user equipment to conduct the direct mode device to device communication with the user equipment, wherein either the further first message or a further second message sent from the base transceiver station to the further user equipment comprises further transmission power information, wherein the further transmission power information indicates a minimum transmission power of the further user equipment for conducting the direct mode device to device communication with the user equipment.

3. A user equipment for enabling lawful interception in a telecommunications network, the telecommunications network comprising a core network and an access network, wherein the user equipment is configured to camp on the telecommunications network and is configured for device to device communication, wherein the user equipment is connected to a base transceiver station of the access network of the telecommunications network, wherein the base transceiver station is configured for allowing the user equipment to conduct device to device communication,
 wherein the user equipment is configured such that in case that the user equipment is subject to lawful interception, and the user equipment sends a request to the base transceiver station to conduct a direct or proximity device to device communication not routed through the base transceiver station, a first message is received by the user equipment from the base transceiver station, wherein the first message comprises an indication of permission for the user equipment to conduct the direct or proximity device to device communication,
 wherein the user equipment is configured such that a minimum transmission power is used by the user equipment when conducting the direct or proximity device to device communication, wherein the minimum transmission power is indicated by transmission power information received by the user equipment either via the first message or via a second message sent from the base transceiver station to the user equipment, such that the direct or proximity device to device communication is subject to lawful interception based on the transmission power of the user equipment being set high enough by the user equipment to allow reception of the direct or proximity device to device communication at the base transceiver station;
 wherein dedicated transmission resources are allocated by the base transceiver station for the user equipment to conduct the direct or proximity device to device communication subject to lawful interception, wherein allocating the dedicated resources includes specifying a radio technology, a frequency and a time slot for the user equipment to conduct the direct or proximity device to device communication subject to lawful interception.

4. A base transceiver station for enabling lawful interception in a telecommunications network, the telecommunications network comprising a core network and an access network, wherein a user equipment, camping on the telecommunications network, is configured for device to device communication, wherein the user equipment is connected to the base transceiver station of the access network of the telecommunications network, wherein the base transceiver station is configured for allowing the user equipment to conduct device to device communication,
 wherein the base transceiver station is configured such that in case that the user equipment is subject to lawful interception, and the base transceiver station receives a request from the user equipment for the user equipment to conduct a direct or proximity device to device communication not routed through the base transceiver station, a first message is sent by the base transceiver station to the user equipment, wherein the first message comprises an indication of permission for the user equipment to conduct the direct or proximity device to device communication,
 wherein the base transceiver station is configured such that either the first message or a second message sent from the base transceiver station to the user equipment comprises transmission power information, wherein the transmission power information indicates a minimum transmission power of the user equipment for conducting the direct or proximity device to device communication such that the direct or proximity device to device communication is subject to lawful interception based on the transmission power of the user equipment is set high enough by the user equipment to allow reception of the direct or proximity device to device communication at the base transceiver station,
 wherein the base transceiver station is further configured to allocate dedicated transmission resources for the user equipment to conduct the direct or proximity device to device communication subject to lawful interception, wherein allocating the dedicated resources includes specifying a radio technology, a frequency and a time slot for the user equipment to conduct the direct or proximity device to device communication subject to lawful interception.

5. A non-transitory computer-readable medium having processor-executable instructions stored thereon for enabling lawful interception in a telecommunications network, the telecommunications network comprising a core network and an access network, wherein a user equipment, camping on the telecommunications network, is configured for device to device communication, wherein the access network of the telecommunications network comprises a base transceiver station, wherein the user equipment is connected to the base transceiver station and the base transceiver station is configured for allowing the user equipment to conduct device to device communication, wherein the user equipment is subject to lawful interception, the processor-executable instructions, when executed, facilitating:
 receiving, by the base transceiver station, a request from the user equipment to conduct a direct or proximity device to device communication not routed through the base transceiver station; and
 sending, by the base transceiver station, a first message to the user equipment, wherein the first message comprises an indication of permission for the user equipment to conduct the direct or proximity device to device communication, wherein either the first message or a second message sent from the base transceiver station to the user equipment comprises transmission power information, wherein the transmission power information indicates a minimum transmission power of the user equipment for conducting the direct or proximity device to device communication such that the direct or proximity device to device communication is subject to lawful interception based on the transmission power of the user equipment being set high enough by the user equipment to allow reception of the direct or proximity device to device communication at the base transceiver station;
 wherein the processor-executable instructions, when executed, further facilitate: allocating, by the base transceiver station, dedicated transmission resources for the user equipment to conduct the direct or proximity device to device communication subject to lawful interception, wherein allocating the dedicated resources includes specifying a radio technology, a frequency and a time slot for the user equipment to conduct the direct or proximity device to device communication subject to lawful interception.

\* \* \* \* \*